No. 815,485. PATENTED MAR. 20, 1906.
J. K. STEWART.
JOINTED SHAFT.
APPLICATION FILED JAN. 16, 1905.
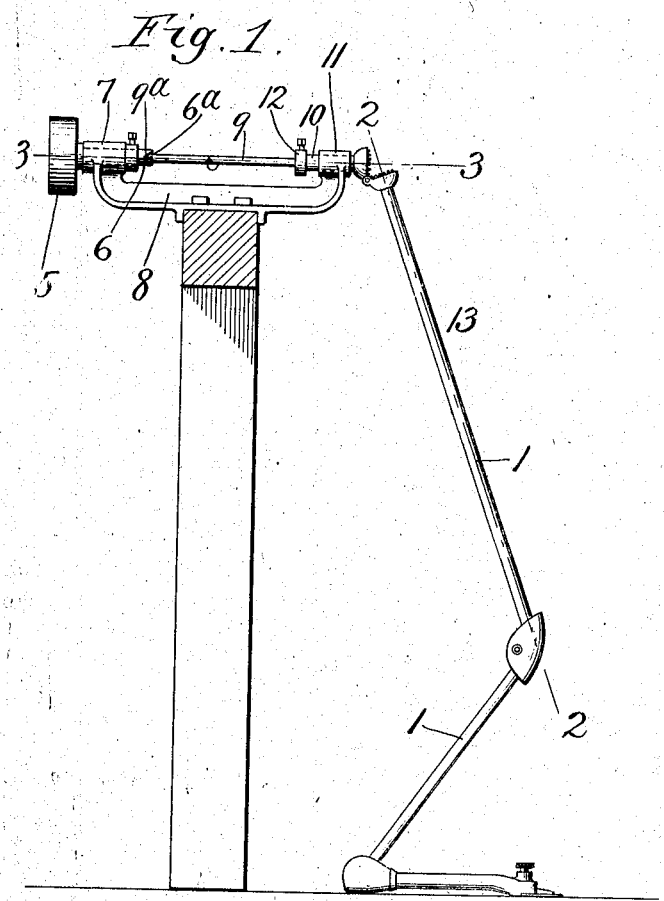
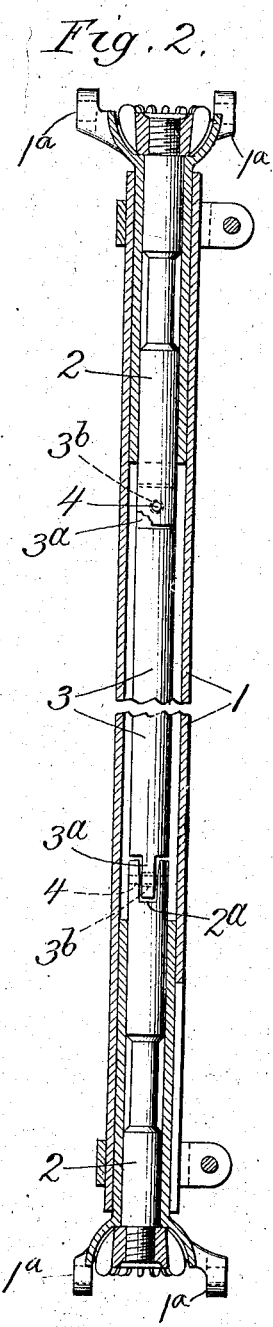
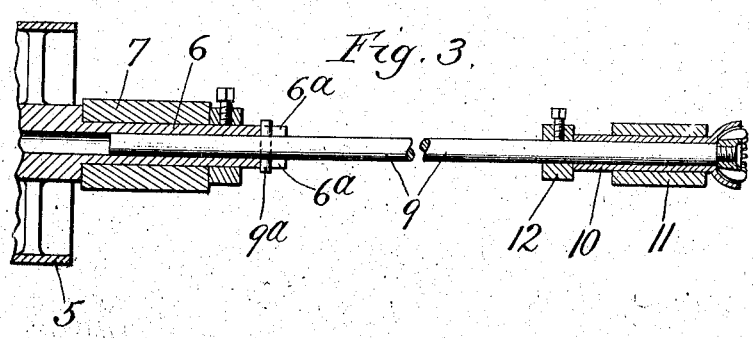
Witnesses.
Edward T. Wray
Fred G. Fischer
Inventor.
John K. Stewart
by Burton Burton
his Attys

UNITED STATES PATENT OFFICE.

JOHN K. STEWART, OF CHICAGO, ILLINOIS.

JOINTED SHAFT.

No. 815,485.   Specification of Letters Patent.   Patented March 20, 1906.

Application filed January 16, 1905. Serial No. 241,403.

*To all whom it may concern:*

Be it known that I, JOHN K. STEWART, a citizen of the United States, residing at Chicago, in the county of Cook and State of Illinois, have invented new and useful Improvements in Jointed Shafts, of which the following is a specification, reference being had to the accompanying drawings, forming a part thereof.

The purpose of this invention is to provide an improved construction in jointed shafts for the purpose of preventing bending or cramping in the bearings.

It consists of the features and elements of construction set out in the claims.

In the drawings, Figure 1 is a sectional side elevation of a jointed shaft embodying this invention and the counter-shaft with which it is connected, section being made across the support of the counter-shaft-bearing bracket. Fig. 2 is a detail section at the line 2 2 on Fig. 1. Fig. 3 is a section at the line 3 3 on Fig. 1.

By the term "jointed shaft," as used in this specification, is meant a power-transmitting shaft which comprises successive members or sections of a casing hinged together at their ends, each section or member having journaled in it a section of a shaft, such shaft-sections being connected together for driving at their proximate ends where they respectively emerge from the casing-sections, so that the entire structure, comprising a plurality of such jointed casing-sections and connected shaft-sections, operates to transmit rotary motion after the manner of a flexible shaft—that is, through as many angles or turns as there are joints in the structure. It is well understood that this form of power-transmitting device has certain advantages over a flexible shaft, in that the friction and consequent loss of power due to the change of direction is limited to that caused by the limited number of changes of direction at the limited number of joints in the casing as compared with the very much larger number occurring in the common flexible shaft made up of links inclosed in a completely-flexible tube which revolves with the flexible shaft or chain; but in the use of such jointed shafts, inasmuch as the casing-sections are necessarily comparatively light and thereby have only limited stiffness, the vibration and springing to which these casing-sections are liable, arising from the rotation of the shaft-sections in them, causes the bearings of the shaft in each section, at the two ends of the latter, to be slightly out of line with each other or to tend to become thus out of line, and this causes a large increase of friction of the shaft-sections at such bearings, which absorbs a very considerable percentage of the power employed and which ought to be transmitted with minimum loss. The same result—loss of power through friction at the bearings—is also liable to be caused by the tendency of the shaft-sections, which are slender relatively to their length between the bearings in the casing of the sections, to become slightly bowed or sprung, so that a centrifugal tendency is developed at their bowed or laterally-deflected part as the shaft rotates, such centrifugal action tending, obviously, to further bow the shaft and cramp its bearings. This difficulty is not avoided when the portion of the shaft in each casing-section is a flexible shaft instead of a single rod or rigid element, because the flexible shaft invariably and very readily and rapidly develops the centrifugal tendency above mentioned, with result that the shaft rubs against the side of the casing at the most bowed or centrifugally-deflected part, and the end elements journaled in the bearings at the two ends of the casing-section are pulled together by such centrifugal deflection of the flexible shaft, and thus there is caused a double friction, which is as prejudicial to the transmission of power as the friction caused by cramping, above mentioned. For overcoming this difficulty without introducing the equal difficulty involved in the use of the ordinary flexible shaft in each casing-section I employ the construction shown in the drawings, in which in each casing-section 1, journaled in bearings at the two ends of the casing-section, there is a shaft section or element composed of three pieces—two bearing-pieces 2 2 in the bearings at the two ends of the casing-section and an intermediate principal piece 3, connected to the two end or bearing-pieces near to the bearings—the connection or joint between the intermediate principal piece and the end bearing-pieces being of the nature of a universal joint, adapted, however, to permit only a slight range of movement in all directions after the manner of a universal joint. It it not meant by this that a large range of movement is prejudicial, but simply that it is not necessary to provide more than a very slight movement, and the joint may, therefore, be of a form which requires no more space than would be required for a simple straight shaft, for, as illustrated, the joint may be made by forming at the end of one of the pieces connected at the joint—as, for example, the bearing-piece 2—an end slot 2ª, and at the connected end of the adjacent piece, as the principal piece 3, a corresponding tenon 3ª, the tenon fitting the slot loosely and the two pieces being connected by a pivot-pin 4, which also has slight play in one of the pieces, which may be afforded by slightly elongating the pivot - aperture, as shown in the drawings, in the pivot-aperture 3ᵇ in the tenon 3ª. An amount of play in all directions at this joint sufficient for the purpose is, in fact, so slight that any representation of it in the drawings to be visible to the eye is an exaggeration of it, and the drawings are to be interpreted with this explanation. With this construction it will be seen that the slight springing or vibration of the casing, which throws the end bearings out of line, carries the end sections of the shaft similarly out of line, keeping them both, however, easy in their respective bearings. It will be seen also that the middle piece 3, constituting so large a portion of the length of the shaft-sections in each casing-section, being nearly the entire length of the shaft between the bearings, is not liable to develop any appreciable centrifugal tendency which would materially affect the bearings by reason of the tendency to draw the ends of the shaft together and that any slight centrifugal tendency which might arise from inexact construction or slight springing of this principal piece of the shaft-section will have no effect to cramp the bearing-pieces in their bearings, and thus practically both difficulties above pointed out are avoided.

It will be noticed that the casing-sections 1 1 are hinged together in the familiar manner, which is shown in Fig. 1, at the upper end of the casing-section 1, where it is hinged to the initial or journaled casing-section 10, and which may be further understood from the showing in Fig. 2 of the hinged lugs 1ª at both ends of the casing-section 1, represented in that figure.

When a jointed shaft has an initial element to which the power is communicated journaled in fixed bearings, the construction shown in Fig. 1 is desirably employed to facilitate disengaging the shaft from the power. In this construction the wheel 5, to which the power is communicated from any source of power, has rigid with it a long quill or hollow hub-shaft 6, which extends through the bearing 7 on the bracket 8, and the shaft element 9, which is the initial element of the flexible shaft, extends into this quill or hollow shaft a sufficient distance to obtain bearing therein, but is not engaged therewith, except by means of a pin 9ª, set through the shaft-section 9 and adapted to be engaged with a notch 6ª in the inner end of the quill 6, but which may be disengaged from said notch when the shaft-section is withdrawn longitudinally. To permit and also to limit such longitudinal movement of the shaft-section 9, the initial casing element 10 of the jointed shaft, which is journaled in a bearing 11 at the opposite end of the bracket 8 from the bearing 6, is made longer than said bearing 11, and said shaft-section 9 being stopped at its outer end against the outer end of said casing-section has a stop-collar 12 at the inner end of said casing-section, so that it is stopped both ways in said casing-section, and said stop-collar 12 is of sufficient diameter to extend beyond the casing-section, so as to operate as a stop for said casing-section against the end of the bearing 11, and thereby said casing-section has a certain limited range of sliding movement in the bearing 11, which is made sufficient to disengage the pin 9ª from the slot 6ª in the end of the quill 6. The longitudinal movement for engagement and disengagement of the pin and slot may be given by the operator taking hold of the next member 13 of the jointed shaft.

I claim—

1. In a jointed shaft, in combination with the casing-sections hinged together at their proximate ends, the shaft-sections in the casing-sections respectively, composed of a plurality of pieces, one piece at each end being a bearing-piece journaled in the casing-sections and protruding therefrom, said pieces being flexibly jointed to each other near the journal-bearing of an end piece within the casing-section.

2. In a jointed shaft, in combination with the casing-sections hinged together at their proximate ends, the shaft-sections in the casing-sections respectively, composed of three pieces, one piece at each end being a bearing-piece journaled in the casing-sections and protruding therefrom, and the intermediate piece having universal-joint connection with the end pieces near the bearings.

3. In a jointed shaft, in combination with the casing-sections hinged together at their proximate ends, the shaft-sections in the casing-sections respectively consisting of three pieces, the two end pieces being journaled in the bearings in the casing-sections and protruding therefrom respectively, the intermediate piece being connected to the other two pieces, the joint connecting said intermediate piece with each end piece being formed by an end slot in one of the connected pieces and a corresponding end tenon in the other piece, and a pivot - pin connecting the two, the tenon having slight lateral play in the slot, and the pivot-pin having slight play longitudinally with respect to the shaft in one of the two connected pieces.

4. In a jointed shaft, power-communicating device, a fixed element of the jointed casing; a shaft element journaled and longitudinally stopped therein; a fixed bearing in which such casing element is journaled, the casing element having limited range of longitudinal movement in the bearing; a power-transmitting wheel having a hollow hub or quill by which it is journaled, the initial shaft element of the jointed shaft being intruded into said hollow quill for support thereon, and means on the quill and shaft respectively adapted to be engaged and disengaged by longitudinal movement of the shaft element.

In testimony whereof I have hereunto set my hand, in the presence of two witnesses, at Chicago, Illinois, this 19th day of December, 1904.

JOHN K. STEWART.

In presence of—
CHAS. S. BURTON,
FREDK. G. FISCHER.